(12) United States Patent
Jin et al.

(10) Patent No.: US 7,678,424 B2
(45) Date of Patent: Mar. 16, 2010

(54) FORMING CARBON NANOTUBE EMITTER

(75) Inventors: Yong-Wan Jin, Seoul (KR); Hyun-Jung Lee, Daejeon-si (KR); Jong-Woon Moon, Suwon-si (KR); Deuk-Seok Chung, Seongnam-si (KR); Jun-Hee Choi, Suwon-si (KR); Sung-Hee Cho, Seoul (KR)

(73) Assignee: Samsung SDI Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 1517 days.

(21) Appl. No.: 10/992,333

(22) Filed: Nov. 19, 2004

(65) Prior Publication Data

US 2005/0129858 A1 Jun. 16, 2005

(30) Foreign Application Priority Data

Dec. 16, 2003 (KR) ............... 10-2003-0091870

(51) Int. Cl.
*B05D 3/02* (2006.01)
(52) U.S. Cl. .................................. 427/372.2
(58) Field of Classification Search ............. 427/372.2
See application file for complete search history.

(56) References Cited

U.S. PATENT DOCUMENTS

| 5,091,251 A | * | 2/1992 | Sakumoto et al. | ......... 428/352 |
|---|---|---|---|---|
| 6,358,660 B1 | * | 3/2002 | Agler et al. | ......... 430/125.32 |
| 2002/0074932 A1 | * | 6/2002 | Bouchard et al. | ......... 313/495 |
| 2002/0151628 A1 | * | 10/2002 | Dheret et al. | ......... 524/270 |
| 2003/0087511 A1 | * | 5/2003 | Hidaka et al. | ......... 438/584 |
| 2004/0070326 A1 | * | 4/2004 | Mao et al. | ......... 313/311 |
| 2004/0191690 A1 | * | 9/2004 | Hayakawa | ......... 430/277.1 |

FOREIGN PATENT DOCUMENTS

| JP | 2003168355 | | 6/2003 |
|---|---|---|---|
| JP | 2003331713 | * | 11/2003 |

OTHER PUBLICATIONS

Shinkai, N. "The hardness of PbO-ZnO-B2O3 glasses", 1983, Chapman and Hall Ltd, Journal of Materials Science 18, 2466,2470.*
Gols, J., European Search Report for European Patent Application No. EP 04256677, dated Jun. 3, 2005.

* cited by examiner

*Primary Examiner*—Timothy H Meeks
*Assistant Examiner*—Nathan T Leong
(74) *Attorney, Agent, or Firm*—Robert E. Bushnell, Esq.

(57) ABSTRACT

A method of forming a carbon nanotube emitter includes: forming a carbon nanotube composite on a substrate with a predetermined shape, coating surface treating material in a liquid phase on the carbon nanotube composite and drying the surface treating material, and peeling the dried surface treating material off of the carbon nanotube composite.

16 Claims, 6 Drawing Sheets

FORMING CARBON NANOTUBE EMITTER

CLAIM OF PRIORITY

This application makes reference to, incorporates the same herein, and claims all benefits accruing under 35 U.S.C. §119 from an application METHOD OF FORMING CARBON NANOTUBE EMITTER earlier filed in the Korean Intellectual Property Office on 16 Dec. 2003 and there duly assigned Ser. No. 2003-91870.

BACKGROUND OF THE INVENTION

1. Field of the Invention

The present invention relates to a method of forming a carbon nanotube emitter, and more particularly, to a method of forming a carbon nanotube emitter that has an improved electric field emission.

2. Description of the Related Art

Recently, Carbon Nanotubes (CNTs) have been widely used as a field emitter for a Field Emission Display (FED) devices or for a backlight for Liquid Crystal Display (LCD) devices. Carbon nanotubes have good electron emission characteristics and notable chemical and mechanical durability. Therefore, considerable research is being conducted with regard to the physical properties and applicability of carbon nanotubes.

In an FED device, electrons are emitted from field emitters formed on cathodes due to an electric field between the cathodes and anodes. Emitted electrons collide with the anodes, thereby causing light to be emitted from fluorescent material formed on the anodes.

A micro-tip formed of a metal, such as Molybdenum (Mo), is widely used as the field emitter of the FED device. However, the lifetime of the tip can be shortened because of an atmospheric gas and a non-uniform electric field in the FED devices. Also, there is a limitation as to how much a work function can be lowered to reduce the driving voltage of an FED device using a metal emitter. To solve these problems, a field emitter is formed using carbon nanotubes having a very high aspect ratio, high durability, and excellent electron conductivity.

An important aspect when forming the carbon nanotube emitter is that the carbon nanotube must vertically protrude from a surface of the carbon nanotube emitter. This is because an emission current from the carbon nanotube can differ according to the arrangement state even if the composition of the carbon nanotube is the same. Therefore, it is desirable to configure the carbon nanotube in a vertical arrangement as much as possible.

A carbon nanotube emitter can be formed using a Chemical Vapor Deposition (CVD) method in which the carbon nanotube is directly grown on a substrate, and can also be formed by a paste method in which the carbon nanotube is formed as a paste containing resins. However, the CVD method, despite the ease of arranging the carbon nanotube in a vertical position, can not be readily applied to a glass substrate since it requires heat treatment at a reaction temperature of over 500° C. This method also requires expensive equipment for forming a large area substrate. Furthermore, the density of the carbon nanotube must be properly controlled. Otherwise, the emission current is reduced if the density of the carbon nanotube is too high. On the other hand, the carbon nanotube paste method includes printing the carbon nanotube paste on a substrate, and baking the printed substrate. However, if a surface of the carbon nanotube emitter is not processed, the arrangement of the carbon nanotubes becomes non-uniform, resulting in a non-uniform light emission from the carbon nanotube emitter.

SUMMARY OF THE INVENTION

Accordingly, the present invention provides a method of forming a carbon nanotube emitter that improves electric field emission by surface treating the carbon nanotube emitter.

According to an aspect of the present invention, a method of forming a carbon nanotube emitter is provided, the method comprising: forming a carbon nanotube composite on a substrate with a predetermined shape, coating a surface treating material in a liquid phase on the carbon nanotube composite and drying the surface treating material, the surface treating material including an organic polymer binder and an inorganic compound, and peeling the dried surface treating material off of the carbon nanotube composite.

The organic polymer binder can include at least one selected from the group consisting of polyvinyl alcohol, polyvinyl acetate, and polyvinyl pyrrolidone.

The concentration of the organic polymer binder in the surface treating material can be 5~20% wt.

The inorganic compound can include at least one selected from the group consisting of $TiO_2$, $SiO_2$, and $Al_2O_3$.

The concentration of the inorganic compound in the surface treating material can be 3~10% wt, and the particle size of the inorganic compound is 1 nm~5 μm, and can be, 10 nm~1 μm.

The viscosity of the surface treating material can be 100~5,000 centipoise.

Forming the carbon nanotube composite can include coating a carbon nanotube paste including carbon nanotubes, an organic binder, an inorganic binder, and a metal powder on a substrate, patterning the carbon nanotube paste to a predetermined shape, and removing the organic binder by baking the patterned carbon nanotube paste.

The organic binder can include a monomer, an oligomer, and a photoinitiator. The monomer can include at least one selected from the group consisting of benzyl acrylate, glycidyl methacrylate, phenoxyethyl acrylate, 2(2-ethoxy)ethyl acrylate), 2-ethylhexyl acrylate, and trimethylolpropane triacrylate. The oligomer can include at least one selected from the group consisting of polyester acrylate, epoxy acrylate, and urethane acrylate. The photoinitiator can include at least one selected from the group consisting of benzyl dimethyl ketal, benzoin normal butylether, and alpha-hydroxy ketone.

The inorganic binder can include a glass frit including $PbO—ZnO—B_2O_3$.

The metal powder can include at least one selected from the group consisting of aluminum, silver, zinc, copper, nickel, and iron.

The carbon nanotube paste can be hardened by ultraviolet rays and patterned. The organic binder of the carbon nanotube paste can be removed by baking at a temperature of 400~500° C.

According to another embodiment of the present invention, a method of forming a carbon nanotube emitter is provided, the method comprising: forming a carbon nanotube composite on a substrate with a predetermined shape, coating a surface treating material including a hardening polymer resin on the carbon nanotube composite and hardening the surface treating material, and peeling the hardened surface treating material off from the carbon nanotube composite.

The surface treating material can be hardened by a method selected from the group consisting of ultraviolet rays, hot air, electronic rays, and far infrared rays.

When hardening the surface treating material with ultraviolet rays, the surface treating material can include at least one selected from the group consisting of epoxy acrylate, urethane acrylate, ester acrylate, ether acrylate, and acrylic acrylate.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
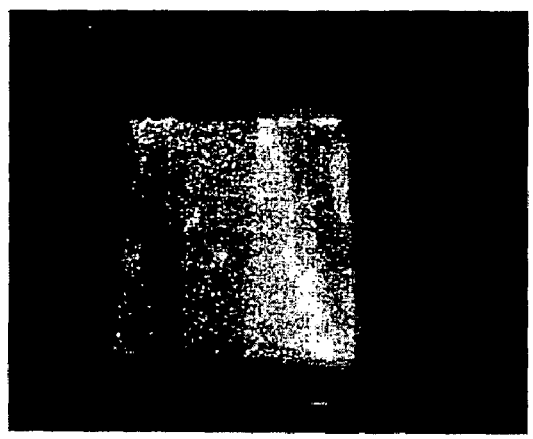
FIG. 1 is a photographed image of light emitted from a carbon nanotube emitter.

FIG. 1 is a photographed image of light emitted from a carbon nanotube emitter. A carbon nanotube emitter can be formed using a Chemical Vapor Deposition (CVD) method in which the carbon nanotube is directly grown on a substrate, and can also be formed by a paste method in which the carbon nanotube is formed as a paste containing resins. However, the CVD method, despite the ease of arranging the carbon nanotube in a vertical position, can not be readily applied to a glass substrate since it requires heat treatment at a reaction temperature of over 500° C. This method also requires expensive equipment for forming a large area substrate. Furthermore, the density of the carbon nanotube must be properly controlled. Otherwise, the emission current is reduced if the density of the carbon nanotube is too high. On the other hand, the carbon nanotube paste method includes printing the carbon nanotube paste on a substrate, and baking the printed substrate. However, if a surface of the carbon nanotube emitter is not processed, the arrangement of the carbon nanotubes becomes non-uniform, resulting in a non-uniform light emission from the carbon nanotube emitter as shown in FIG. 1.

The present invention will now be described more fully with reference to the accompanying drawings in which exemplary embodiments of the invention are shown. Like reference numerals in the drawings denote like elements.

Figure 2A:
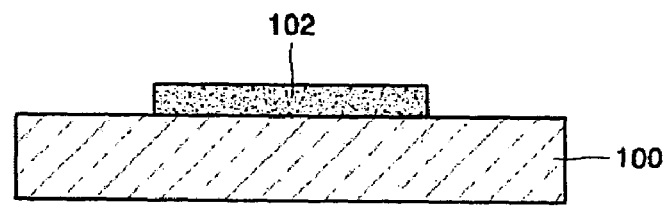
FIGS. 2A through 2C are cross-sectional views of a method of forming a carbon nanotube emitter according to an embodiment of the present invention.
Figure 2B:
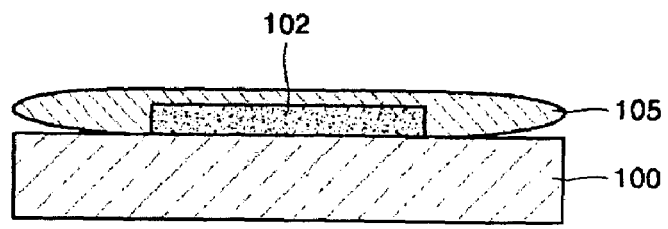
Figure 2C:
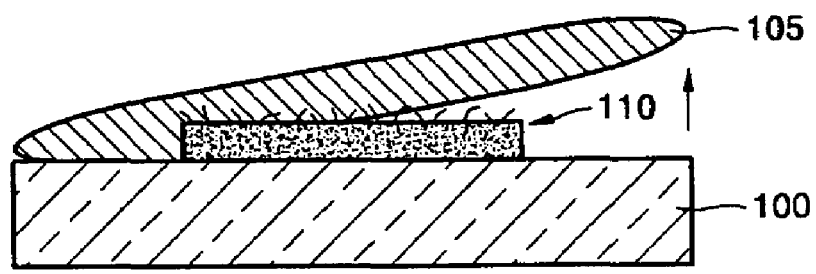

FIGS. 2A through 2C are cross-sectional views of a method of forming a carbon nanotube emitter according to an embodiment of the present invention.

Referring FIG. 2A, a carbon nanotube composite 102 having a predetermined shape is formed on a substrate 100. The substrate 100 can be made of glass.

More specifically, after forming a carbon nanotube paste containing carbon nanotubes, an organic binder, an inorganic binder, and a metal powder, the carbon nanotube paste is coated on the substrate 100 using a screen print method.

The carbon nanotubes can be formed in a single wall, a double wall, or a multiple wall configuration, and there is no specific limitation to the length of the wall, but it can be approximately 0.5~2 µm. The concentration of the carbon nanotubes in the carbon nanotube paste is approximately 1~30% wt.

The organic binder includes a monomer, an oligomer, and a photoinitiator. The monomer can be at least one selected from the group consisting of benzyl acrylate, glycidyl methacrylate, phenoxyethyl acrylate, 2(2-ethoxy)ethyl acrylate, 2-ethylhexyl acrylate, and trimethylolpropane triacrylate. The oligomer can be at least one selected from the group consisting of polyester acrylate, epoxy acrylate, and urethane acrylate. The photoinitiator can be at least one selected from the group consisting of benzyl dimethyl ketal, benzoin normal butylether, and alpha-hydroxy ketone. The concentration of the organic binder in the carbon nanotube paste is approximately 30~90 wt %.

The inorganic binder includes a glass frit containing $PbO$—$ZnO$—$B_2O_3$. The particle size of the inorganic binder can be approximately 0.1~5 µm, and the concentration of the inorganic binder in the carbon nanotube paste can be approximately 0.1~20% wt.

The metal powder used to easily supply electricity to the carbon nanotube can include at least one selected from the group consisting of aluminum, silver, zinc, copper, nickel, and iron. Preferably, the particle size of the metal powder is approximately 1~500 nm, and the concentration of the metal powder in the carbon nanotube paste is approximately 0.1~20% wt.

The carbon nanotube paste coated on the substrate 100 is then patterned to a predetermined shape using an ultraviolet hardening method.

The patterned carbon nanotube paste on the substrate 100 is baked at a temperature of approximately 400~500° C. In this process, the organic binder is removed from the carbon nanotube paste, and a carbon nanotube composite 102 with a predetermined shape that facilitates effective electron emission in a vacuum is formed.

However, the carbon nanotubes in the carbon nanotube composite 102 formed in this manner are buried or laid down on a surface during the heating process. In this state, electron emission is not efficiently performed. Therefore, the surface of the carbon nanotube composite 102 must be treated to attain the desired electron emission. To treat the surface, a bonding and contraction method is used in an embodiment of the present invention.

Referring to FIG. 2B, a liquid phase surface treating material 105 that includes an organic polymer binder and an inorganic compound is coated on the carbon nanotube composite 102 and dried.

The organic polymer binder is used to form a film and can include at least one selected from the group consisting of polyvinyl alcohol, polyvinyl acetate, and polyvinyl pyrrolidone. The concentration of the organic polymer binder in the surface treating material 105 can be approximately 5~20% wt.

The inorganic compound controls the contraction of the surface treating material 105, and can include at least one selected from the group consisting of titanium oxide ($TiO_2$), silica ($SiO_2$), and alumina ($Al_2O_3$). The concentration of the inorganic compound in the surface treating material 105 can be approximately 3~10% wt. As the particle size of the inorganic compound becomes finer, adhesion between the carbon nanotubes and the surface treating material 105 increases. However, coating becomes difficult when a large amount of surface treatment material is used. The particle size of the inorganic compound is approximately 1 nm~5 μm, and preferably can be approximately 10 nm~1 μm.

The surface treating material 105 is formed as a paste by adding water to the mixture of the organic polymer binder and the inorganic compound. The concentration of the water in the surface treating material 105 can be approximately 40~70% wt. The viscosity of the surface treating material 105 is maintained at approximately 100~5,000 centipoise. The surface treating material 105 in the liquid phase is coated on the carbon nanotube composite 102 formed on the substrate 100 and dried.

Referring to FIG. 2C, a carbon nanotube emitter having a large number of vertically erected carbon nanotubes on the surface thereof is obtained by peeling off the dried surface treating material 105 from the carbon nanotube composite 102.

As described above, in an embodiment of the present invention, an adhesive property of an organic polymer binder and a contraction property of an inorganic compound are used to increase the extent to which the carbon nanotubes are vertically erected. The adhesive force of an organic polymer depends on the surface energy of the organic polymer, and an organic compound having low molecular regularity, i.e., low crystallinity has a strong adhesion force. Also, an organic compound having acetate, epoxy, or aldehyde on its functional group has a strong adhesion force and the force of peeling off the surface treating material 105 varies according to the contraction rate of the surface treating material 105. The force can be controlled by crystallinity of the organic polymer and adhesion force and concentration of the inorganic compound. That is, an organic polymer with low crystallinity has high contraction rate and the contraction rate of the organic polymer decreases if an amount of inorganic compound mixed increases. On the other hand, while the higher adhesive force and contraction rate is advantageous for vertical erection of the carbon nanotubes, if these are too high, the electrodes of the FED device can be damaged when peeling off the surface treating material 105. Therefore, the adhesive force and contraction rate must be controlled.

Figure 3:
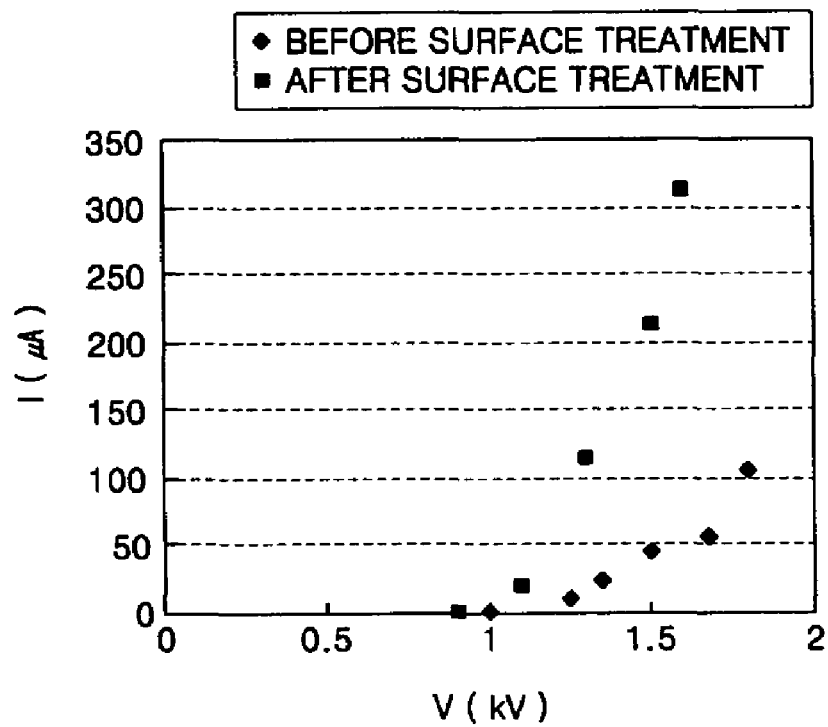
FIG. 3 is a graph of a current-voltage characteristic of a carbon nanotube emitter, before and after surface treatment, according to an embodiment of the present invention.

FIG. 3 is a graph of a current-voltage characteristic of a carbon nanotube emitter, before and after surface treatment, according to an embodiment of the present invention.

Referring to FIG. 3, it shows that the current-voltage characteristic is improved after treating the surface.

Figure 4A:
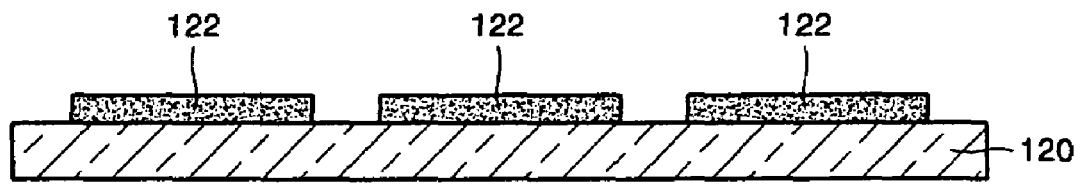
FIGS. 4A through 4C are cross-sectional views of a method of forming a carbon nanotube emitter according to another exemplary embodiment of the present invention.
Figure 4B:
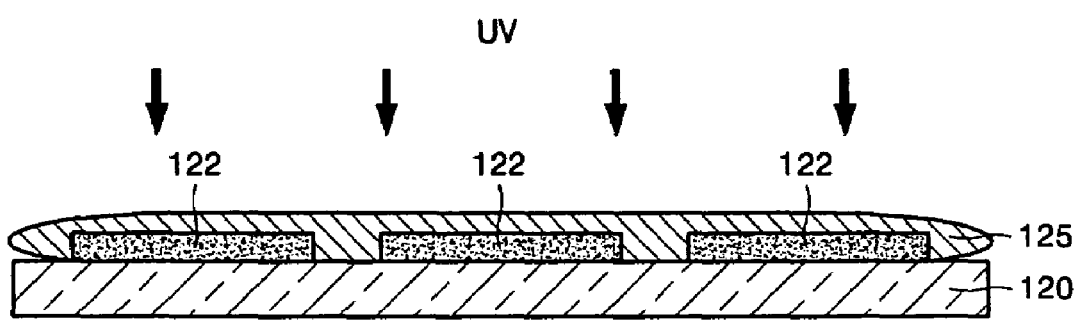
Figure 4C:
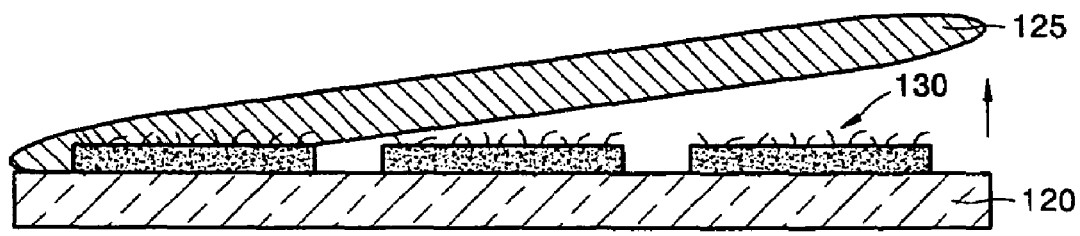

FIGS. 4A through 4C are cross-sectional views of a method of forming a carbon nanotube emitter according to another embodiment of the present invention.

Referring to FIG. 4A, a carbon nanotube composite 122 is formed on a substrate 120 with a predetermined shape. Since the method of forming the carbon nanotube composite 122 was described above, a detailed description thereof has been omitted here.

Referring to FIG. 4B, a surface treating material 125 including a liquid phase hardening polymer resin is coated on the carbon nanotube composite 122. After drying the surface treating material 125, the surface treating material 125 is hardened by exposure to ultraviolet light. The surface treating material 125 can also be hardened by hot air drying, or electron rays or far infrared rays.

When the surface treating material 125 is hardened by ultraviolet rays, the surface treating material 125 can include at least one selected from the group consisting of epoxy acrylate, urethane acrylate, ester acrylate, ether acrylate, and acrylic acrylate.

Referring to FIG. 4C, when the hardened surface treating material 125 is peeled off from the carbon nanotube composite 122, a carbon nanotube emitter 130 having a large number of carbon nanotubes protruding from the surface thereof is formed.

Figure 5:
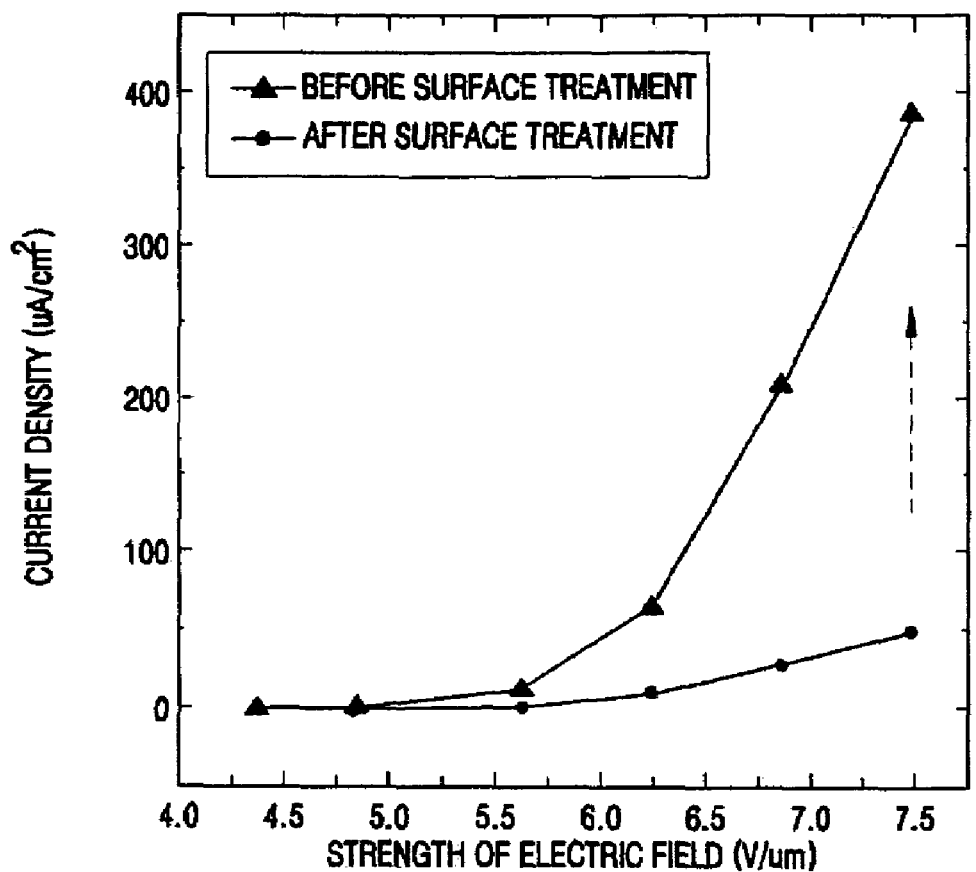
FIG. 5 is a graph of an electric field emission characteristic of a carbon nanotube emitter, before and after surface treatment, according to another embodiment of the present invention.

FIG. 5 is a graph of an electric field emission characteristic of a carbon nanotube emitter, before and after surface treatment, according to another exemplary embodiment of the present invention. Referring to FIG. 5, the electric field emission characteristic is improved after surface treatment.

Figure 6:
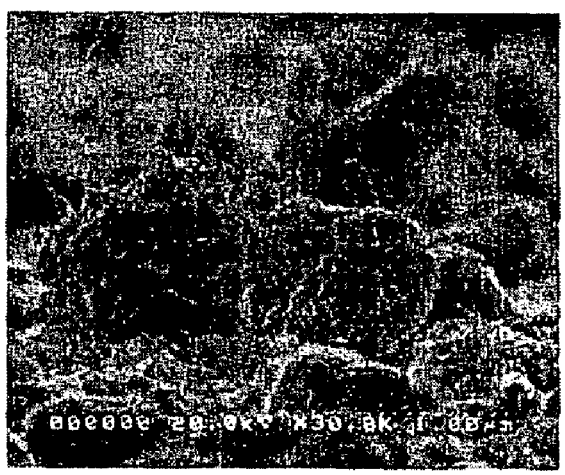
FIG. 6 is a Scanning Electron Microscopy (SEM) image of a carbon nanotube emitter according to another embodiment of the present invention.

FIG. 6 is a SEM image of a surface of the carbon nanotube emitter after treating the surface according to another exemplary embodiment of the present invention. Referring to FIG. 6, the carbon nanotube emitter has a large number of carbon nanotubes protruding from its surface after the surface treatment.

Figure 7:
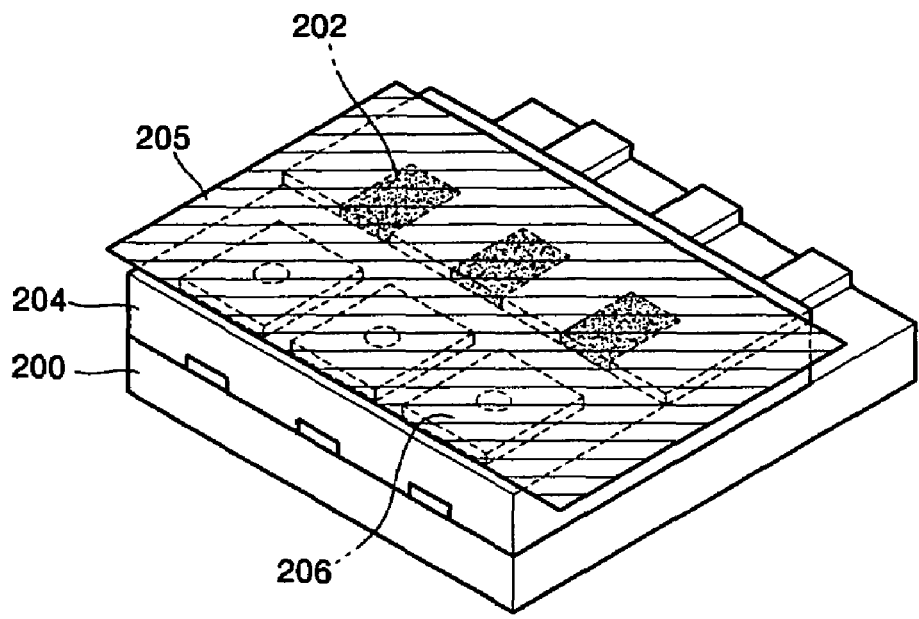
FIG. 7 is a perspective view of a method of forming a carbon nanotube emitter in a FED device according to an embodiment of the present invention.

FIG. 7 is a perspective view of a method of forming a carbon nanotube emitter according to an embodiment of the present invention in FED device.

Figure 8:
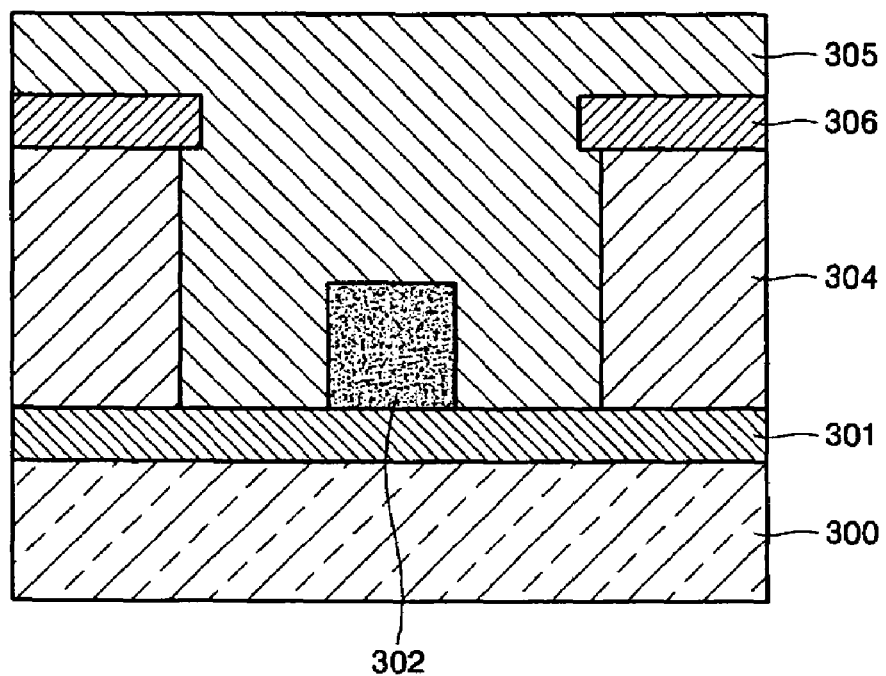
FIG. 8 is a cross-sectional view of a method of forming a carbon nanotube emitter in a FED device according to an embodiment of the present invention.

FIG. 8 is a cross-sectional view of a method of forming a carbon nanotube emitter according to another embodiment of the present invention in FED device.

Referring to FIG. 7, a FED device includes a plurality of carbon nanotube composites 202 and a plurality of gate electrodes 206 disposed on a substrate 200. A surface treating material 205 is coated on the carbon nanotube composites 202 and the gate electrodes 206, and dried. Then, a carbon nanotube emitter with improved electric field emission is formed by peeling off the coated surface treating material 205. In FIG. 7, reference numeral 204 denotes an insulating layer. Referring to FIG. 8, a FED device is formed by sequentially stacking a cathode 301, an insulating layer 304, and a gate electrode 306 on a substrate 300. A carbon nanotube composite 302 is formed on the cathode 301 inside a hole formed in the insulating layer 304. A surface treating material 305 is coated on the gate electrode 306 and the carbon nanotube composite 302. Since the surface treating material 305 is in a liquid phase, it can be well coated on the carbon nanotube composite 302 inside the hole.

Figure 9:
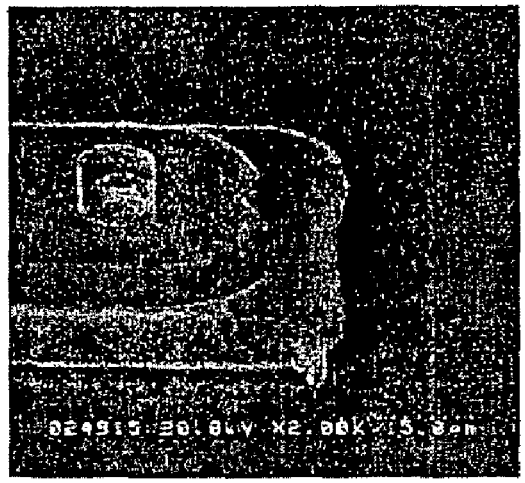
FIG. 9 is a SEM image of the FED device of FIG. 8, a surface thereof being coated with a surface treatment material.

FIG. 9 is a SEM image of the FED device of FIG. 8, a surface thereof having been coated with the surface treatment material 305. Then, a carbon nanotube emitter that has improved electric field emission is formed after drying and peeling off the coated surface treating material 305.

Figure 10:
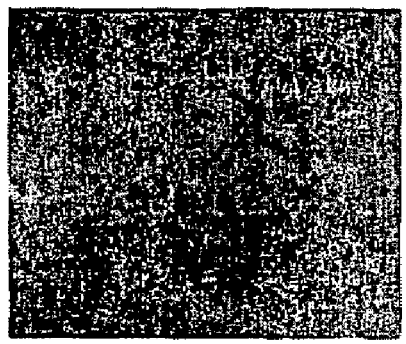
FIG. 10 is a photographed image of light emitted from the FED of FIG. 7 after a surface thereof has been treated.
Figure 11:
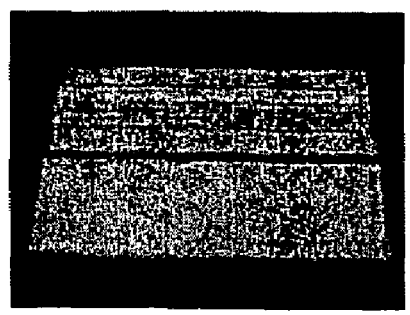
FIG. 11 is a photographed image of light emitted from the FED of FIG. 8 after a surface thereof has been treated.

FIG. 10 is a photographed image of light emitted by the FED of FIG. 7 after a surface thereof has been treated. FIG. 11 is a photographed image of light emitted by the FED of FIG. 8 after a surface thereof has been treated. Referring to FIGS. 10 and 11, a uniform light emission is achieved.

According to the embodiments of the present invention, a method of forming a carbon nanotube emitter provides a carbon nanotube emitter that has improved electric field emission by forming a large number of carbon nanotubes vertically protruding from the surface of the carbon nanotube emitter by coating a surface treating material in a liquid phase on the carbon nanotube composite and peeling the surface treating material off. Also, the method of forming the carbon nanotube emitter can be applied to a variety of structure devices which include a carbon nanotube emitter since the method of forming carbon nanotubes according to the present invention uses a surface treating material in a liquid phase.

While this invention has been particularly shown and described with reference to the embodiments thereof, it will be understood by those skilled in the art that various modifications in form and details can be made therein without departing from the spirit and scope of the invention as defined by the appended claims.

What is claimed is:

1. A method of forming a carbon nanotube emitter, the method comprising:
   forming a carbon nanotube composite on a substrate with a predetermined shape;
   coating a surface treating material in a liquid phase on the carbon nanotube composite and drying the surface treating material, the surface treating material including an organic polymer binder and an inorganic compound, wherein the inorganic compound includes at least one selected from the group consisting of $TiO_2$, $SiO_2$, and $Al_2O_3$; and
   peeling the dried surface treating material off of the carbon nanotube composite.

2. The method of claim 1, wherein the organic polymer binder includes at least one selected from the group consisting of polyvinyl alcohol, polyvinyl acetate, and polyvinyl pyrrolidone.

3. The method of claim 1, wherein the concentration of the organic polymer binder in the surface treating material is 5~20% wt.

4. The method of claim 1, wherein the concentration of the inorganic compound in the surface treating material is 3~10% wt.

5. The method of claim 1, wherein the particle size of the inorganic compound is 1 nm~5 μm.

6. The method of claim 5, wherein the particle size of the inorganic compound is 10 nm~1 μm.

7. The method of claim 1, wherein the viscosity of the surface treating material is 100~5,000 centipoise.

8. The method of claim 1, wherein the forming the carbon nanotube composite comprises:
   coating a carbon nanotube paste including carbon nanotubes, an organic binder, an inorganic binder, and a metal powder on a substrate;
   patterning the carbon nanotube paste into a predetermined shape; and
   removing the organic binder by baking the patterned carbon nanotube paste.

9. The method of claim 8, wherein the organic binder includes a monomer, an oligomer, and a photoinitiator.

10. The method of claim 9, wherein the monomer includes at least one selected from the group consisting of benzyl acrylate, glycidyl methacrylate, phenoxyethyl acrylate, 2(2-ethoxy)ethyl acrylate, 2-ethylhexyl acrylate, and trimethylolpropane triacrylate.

11. The method of claim 9, wherein the oligomer includes at least one selected from the group consisting of polyester acrylate, epoxy acrylate, and urethane acrylate.

12. The method of claim 9, wherein the photoinitiator includes at least one selected from the group consisting of benzyl dimethyl ketal, benzoin normal butylether, and alpha-hydroxy ketone.

13. The method of claim 8, wherein the inorganic binder includes a glass frit including $PbO$—$ZnO$—$B_2O_3$.

14. The method of claim 8, wherein the metal powder includes at least one selected from the group consisting of aluminum, silver, zinc, copper, nickel, and iron.

15. The method of claim 8, wherein the carbon nanotube paste is hardened by ultraviolet rays and patterned.

16. The method of claim 8, wherein the organic binder of the carbon nanotube paste is removed by baking at a temperature of 400~500° C.

* * * * *